(12) United States Patent  
Shimizu et al.

(10) Patent No.: US 8,039,132 B2
(45) Date of Patent: Oct. 18, 2011

(54) PERFLUOROPOLYETHER COMPOUND, AND LUBRICANT AND MAGNETIC DISK EACH USING THE SAME

(75) Inventors: Tsuyoshi Shimizu, Kobe (JP); Kazunori Shirai, Kobe (JP); Nagayoshi Kobayashi, Kobe (JP)

(73) Assignee: Moresco Corporation, Hyogo (JP)

( * ) Notice: Subject to any disclaimer, the term of this patent is extended or adjusted under 35 U.S.C. 154(b) by 50 days.

(21) Appl. No.: 12/451,482

(22) PCT Filed: May 9, 2008

(86) PCT No.: PCT/JP2008/058981
§ 371 (c)(1),
(2), (4) Date: Nov. 13, 2009

(87) PCT Pub. No.: WO2008/140121
PCT Pub. Date: Nov. 20, 2008

(65) Prior Publication Data
US 2010/0136371 A1    Jun. 3, 2010

(30) Foreign Application Priority Data

May 15, 2007    (JP) ................. 2007-129742

(51) Int. Cl.
*G11B 5/66* (2006.01)
(52) U.S. Cl. ..................... 428/835.8; 508/422
(58) Field of Classification Search .......... 508/422
See application file for complete search history.

(56) References Cited

U.S. PATENT DOCUMENTS

| | | | |
|---|---|---|---|
| 6,730,403 | B1 | 5/2004 | Shirai et al. |
| 7,670,695 | B2 * | 3/2010 | Wakabayashi et al. .... 428/833.3 |
| 2004/0072034 | A1 | 4/2004 | Shimokawa et al. |
| 2005/0170136 | A1 | 8/2005 | Shimokawa et al. |
| 2008/0020171 | A1 | 1/2008 | Wakabayashi et al. |
| 2009/0023017 | A1 | 1/2009 | Tomiyasu et al. |

FOREIGN PATENT DOCUMENTS

| | | | |
|---|---|---|---|
| EP | 1873162 | * | 1/2008 |
| JP | 2002-275484 | | 9/2002 |
| WO | WO 2006/009057 | * | 1/2006 |
| WO | 2007/043450 | | 4/2007 |

OTHER PUBLICATIONS

International Search Report issued Jul. 1, 2008 in International (PCT) Application No. PCT/JP2008/058981.
P. H. Kasai, "Perfluoropolyethers: Intramolecular Disproportionation", Macromolecules, vol. 25, No. 25, pp. 6791-6799, 1992.

* cited by examiner

*Primary Examiner* — Holly Rickman
(74) *Attorney, Agent, or Firm* — Wenderoth Lind & Ponack, L.L.P.

(57) ABSTRACT

A compound of the formula (I), and lubricant, and magnetic disk each using the same $$A\text{-}(CH_2\text{—}Rf\text{—}CH_2O\text{—}B\text{—}O)_n\text{—}CH_2\text{—}Rf\text{—}CH_2\text{-}A \quad (I)$$

wherein n is an integer of 1 to 4, A is a group of the formula (a) below, and B is a group of the formula (b) below, p being 1 or 2, R being $C_{1-4}$ fluoroalkyl, Rf is $-CF_2O(CF_2CF_2O)_x(CF_2O)_yCF_2-$ or $-CF_2CF_2O(CF_2CF_2CF_2O)_zCF_2CF_2-$, x, y and z being each a real number of 0 to 50.

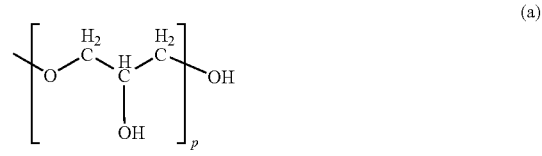

(a)

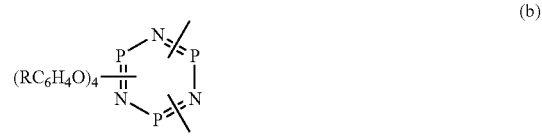

(b)

6 Claims, 1 Drawing Sheet

PERFLUOROPOLYETHER COMPOUND, AND LUBRICANT AND MAGNETIC DISK EACH USING THE SAME

This application is a U.S. national stage of International Application No. PCT/JP2008/058981 filed May 9, 2008.

TECHNICAL FIELD

The present invention relates to perfluoropolyether compounds having a cyclophosphazene group in the molecular main chain and hydroxyl at opposite molecular terminals, lubricants containing the compound and magnetic disks having the lubricant applied thereto.

BACKGROUND ART

With an increase in the recording density of magnetic disks, the distance between the magnetic disk serving as a recording medium and the head for use in recording of information or playback has become almost nil close to contact therebetween. The magnetic disk is provided over the surface thereof with a carbon protective film or lubricant film for the purpose of diminishing abrasion due to the contact or sliding of the head thereon or preventing contamination of the disk surface.

The carbon protective film is produced generally by the sputtering process or CVD process. Since the disk surface is protected with the two films, i.e., the carbon protective film and the lubricant film thereover, the interaction between the carbon protective film and the lubricant is important.

The lubricants generally in use are perfluoropolyethers having functional groups. Examples of functional groups are hydroxyl, amino and cyclophosphazene group. More specific examples of lubricants include Fomblin ZTETRAOL manufactured by Solvay Solexis Inc. and having hydroxyl, and PHOSFAROL A20H, product of MORESCO Corporation and having both hydroxyl and cyclophosphazene groups.

Fomblin ZTETRAOL exhibits good properties to adhere to the disk due to the presence of the hydroxyl at opposite terminals of the molecule, does not spatter even when the disk rotates at a high speed and is capable of retaining the form of a lubricant film. However, this perfluoropolyether compound is low in resistance to Lewis acids, reacts with $Al_2O_3$ in the component of the head and becomes cleaved in its main chain (see, for example, Nonpatent Literature 1). When this cleavage progresses, the compound becomes lower in molecular weight, eventually vaporizing off from the magnetic disk surface and failing to retain the form of a lubricant film in systems involving contact or sliding movement between the head and disk.

On the other hand, PHOSFAROL A20H has at one terminal of the molecule a hydroxyl group contributing to the adhesion to the disk and at the other terminal a cyclophosphazene group for inhibiting the cleavage of the perfluoropolyether main chain with Lewis acids. Accordingly, the lubricant does not spatter even if the disk is in high-speed rotation, the compound is inhibited from decomposing with the $Al_2O_3$ in the component of the head and the lubricant is capable of retaining the film form. However, if the carbon protective layer under the lubricant lowers in surface polarity, the number of lubricant molecules adsorbing to the ground layer through a hydrogen bond reduces because of the presence of a single hydrogen group, entailing the likelihood that the lubricant will spatter during high-speed rotation.

A straight-chain perfluoropolyether compound has been disclosed which is improved in adhering properties over A20H and which has at one terminal of the molecule a plurality of hydroxyl groups and at the other terminal a cyclophosphazene group (Patent Literature 1). It has been found that the disclosed compound exhibits higher adhering properties than A20H and ZTETRAOL, whereas compounds are expected which are satisfactory in both adhering properties and decomposition resistance.

[Nonpatent Literature 1] Macromolecules, 1992, Vol. 25, pp. 6791-6799

[Patent Literature 1] WO2006/009057

An object of the present invention is to provide a stable compound which remains free of decomposition even when brought into contact with the head and which exhibits good adhering properties on the disk surface.

DISCLOSURE OF THE INVENTION

The present invention provides the following invention.

(1) A compound of the formula (I)

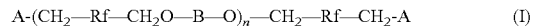

$$A\text{-}(CH_2\text{—}Rf\text{—}CH_2O\text{—}B\text{—}O)_n\text{—}CH_2\text{—}Rf\text{—}CH_2\text{-}A \quad (I)$$

wherein n is an integer of 1 to 4, A is a group of the formula (a) below, and B is a group of the formula (b) below, p being 1 or 2, R being $C_{1-4}$ fluoroalkyl. Examples of Rf are —$CF_2O$ $(CF_2CF_2O)_x(CF_2O)_yCF_2$— and —$CF_2CF_2O(CF_2CF_2\text{-}CF_2O)_zCF_2CF_2$—, x, y and z being each a real number of 0 to 50.

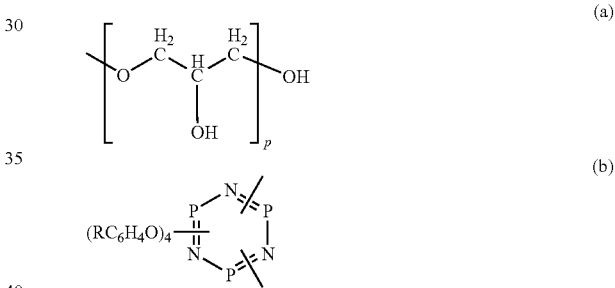

(2) A compound as defined in (1) above wherein n is 1, and p is 1 or 2.

(3) A lubricant containing a compound of the formula (I).

(4) A lubricant containing a compound of the above (2).

(5) A magnetic disk having at least a recording layer and a protective layer formed over a substrate, and a lubricant layer provided over a surface of the resulting assembly and comprising a compound containing a perfluoropolyether structure, the disk having a compound of the formula (I) as the lubricant layer.

(6) A magnetic disk as defined in (5) above which has a compound of the above (2) as the lubricant layer.

[1] The perfluoropolyether of the formula (I) of the invention is a perfluoropolyether compound having a cyclophosphazene group in the main chain of the molecule and hydroxyl at each of opposite terminals of the molecule.

[1-1] Preparation Process 1

The perfluoropolyether compound which has a cyclophosphazene group in the molecular main chain and hydroxyl at the molecular opposite terminals and which is represented by the formula (I) wherein n is 1 and p is 1 is prepared, for example, by the following process. Cyclophospazene having four $RC_6H_4O$— groups and two chlorine atoms and a straight-chain perfluoropolyether having one hydroxyl group at one terminal and two hydroxyl groups at the other terminals are heated along with metallic sodium with stirring. The reaction is conducted at a temperature of 50 to 100° C., preferably 60 to 80° C. for 10 to 70 hours, preferably for 20 to 50 hours. It is desirable to use 0.5 to 3 equivalents of the perfluoropolyether and 1 to 4 equivalents of metallic sodium, based on the cyclophosphazene. The reaction mixture was thereafter treated, for example, by washing with water and column chromatography for purification to obtain the desired perfluoropolyether compound having a cyclophosphazene group in the molecular main chain and hydroxyl at opposite terminals of the molecule.

The R in the substituent of the cyclophosphazene is a $C_{1-4}$ fluoroalkyl group, such as a $C_{1-4}$ perfluoroalkyl group, 1,1,2,2-tetrafluoroethy group, 1,1,2,2,3,3-hexafluoropropyl group and 1,1,2,2,3,3,4,4-octafluorobutyl group. The substitution position of R may be any of the ortho position, meta position and para position.

Examples of perfluoropolyethers having one hydroxyl group at one terminal and two hydroxyl groups at the other terminal are $HOCH_2CF_2O(CF_2CF_2O)_x(CF_2O)_yCF_2CH_2\text{-}OCH_2CH(OH)CH_2OH$ and $HOCH_2CF_2CF_2O(CF_2CF_2\text{-}CF_2O)_zCF_2CF_2CH_2OCH_2CH(OH)CH_2OH$ wherein x and y are each a real number of 0 to 50, preferably 0 to 30, more preferably 0 to 20, and z is a real number of 1 to 50, preferably 1 to 30, more preferably 1 to 20. These compounds have a molecular weight distribution.

[1-2] Preparation Process 2

The perfluoropolyether compound which has a cyclophosphazene group in the molecular main chain and hydroxyl at the molecular opposite terminals and which is represented by the formula (I) wherein n is 4 and p is 1 is prepared, for example, by the same process as the preparation process 1 except that the reaction is conducted using a perfluoropolyether having one hydroxyl group at each of opposite terminals in addition to the perfluoropolyether having one hydroxyl group at one terminal and two hydroxyl groups at the other terminal. In the mixture of the perfluoropolyether having one hydroxyl group at one terminal and two hydroxyl groups at the other terminal and the perfluoropolyether having one hydroxyl group at each of opposite terminals, the molar concentration of the latter polyether is 20 to 99%, preferably 40 to 80%, more preferably 50 to 70%.

[1-3] Preparation Process 3

The perfluoropolyether compound which has a cyclophosphazene group in the molecular main chain and hydroxyl at the molecular opposite terminals and which is represented by the formula (I) wherein n is 4 and p is 2 is prepared, for example, by the same process as the preparation process 2 except that the reaction is conducted using a perfluoropolyether having one hydroxyl group at one terminal and three hydroxyl groups at the other terminal, in place of the perfluoropolyether having one hydroxyl group at one terminal and two hydroxyl groups at the other terminal. In the mixture of the perfluoropolyether having one hydroxyl group at one terminal and three hydroxyl groups at the other terminal and the perfluoropolyether having one hydroxyl group at each of opposite terminals, the molar concentration of the latter polyether is 20 to 99%, preferably 40 to 80%, more preferably 50 to 70%.

[1-4] Method of Use

The compound of the present invention is applied to the magnetic disk surface by diluting the compound with a solvent and coating the disk surface with the diluted compound. Examples of useful solvents are PF-5060, PF-5080, HFE-7100 and HFE-7200 manufactured by 3M, Vertrel-XF, product of DuPont, etc. The concentration of the compound as diluted is up to 1 wt. %, preferably 0.001 to 0.1 wt. %.

While the compound of the invention is usable singly, the compound can be used also as mixed in a desired ratio with another material, such as Fomblin Zdol, Ztetraol, Zdol TX, AM manufactured by Solvay Solexis, Demnum manufactured by Daikin Industries, Ltd., Krytox manufactured by DuPont, or the like.

[1-5] Use

The compound of the present invention is useful, for example, as a lubricant for giving improved sliding characteristics to the magnetic disk in magnetic disk devices. The compound of the invention is characterized by the formation of hydrogen bonding of hydroxyl with a polar site, the covalent bond thereof with a dangling bond (unlinked bond) and further by the interaction of the cyclophosphazene group with a carbon unsaturated bond. Accordingly, the compound is usable as a surface protective film for magnetic heads, photomagnetic recording devices, magnetic tapes, plastics and like organic materials having a carbon protective film, and also as a surface protective film for inorganic materials such as $Si_3N_4$, SiC and $SiO_2$.

(2) Concerning Magnetic Disks

[2-1] Structure of Magnetic Disks

FIG. 1 shows a sectional view schematically showing the magnetic disk of the invention.

The magnetic disk of the invention comprises a substrate 1, at least one recording layer 2 formed on the substrate 1, a protective layer 3 on the recording layer 2 and a lubricant layer 4 formed thereon, as an outermost layer, which contains the compound of the invention.

The substrate 1 is composed of aluminum alloy, glass and like ceramics, polycarbonate or the like.

The recording layer of the magnetic disk, i.e., the magnetic layer is composed of mainly elements capable of forming ferromagnetic bodies, such as iron, cobalt or nickel, alloy or oxide containing chromium, platinum or tantalum in addition to such elements. These materials are applied by, e.g., a plating method or a sputtering method.

The protective layer is formed of carbon, SiC, $SiO_2$ or the like. The layer is formed by a sputtering method or CVD method.

[2-2] Method of Forming Lubricant Layer

Lubricant layers are presently up to 30 Å in thickness, so that when a lubricant having a viscosity of higher than about 100 mPa·s at 20° C. is applied as it is, the resulting film is likely to have an excessively large thickness. Accordingly the lubricant for use in coating is used as dissolved in a solvent. When the compound of the present invention is applied as dissolved in a solvent, the film thickness to be obtained is easy to control in the case where the present compound serves singly as a lubricant and also in the case where the compound is used as mixed, for example, with Fomblin Zdol, Ztetraol, Zdol TX, AM, products of Solvay Solexis, Demnum manufactured by Daikin Industries, Ltd., Krytox manufactured by Dupont, etc. The concentration varies with the method and conditions of application, mixing ratio, etc. The lubricant film of the present invention is preferably 5 to 30 Å in thickness.

In order to assure the lubricant of improved adhesion to the ground layer, the lubricant applied can be subjected to heat treatment or ultraviolet treatment. The heat treatment is conducted at 60 to 150° C., preferably at 80 to 150° C. The ultraviolet treatment is conducted using ultraviolet rays of 185 nm and 254 nm in main wavelength.

[2-3] Application

The magnetic disk of the invention can be applied to a magnetic disk apparatus which can accommodate the disk and which is provided with a magnetic disk drive including a head for recording, reproducing and erasing information and a motor for rotating the disk; and with a control system for controlling the drive.

The magnetic disk of the invention and the magnetic disk apparatus produced using the magnetic disk thereof can be applied for the following: electronic computers, and outer memories for word processors; and can be also applied in navigation systems, games, cellular phone, PHS (personal handyphone system) and like instruments and machines and inner and outer memories for prevention of crimes in buildings, and for management/control systems of power plants.

BEST MODE FOR CARRYING OUT THE INVENTION

Figure 1:
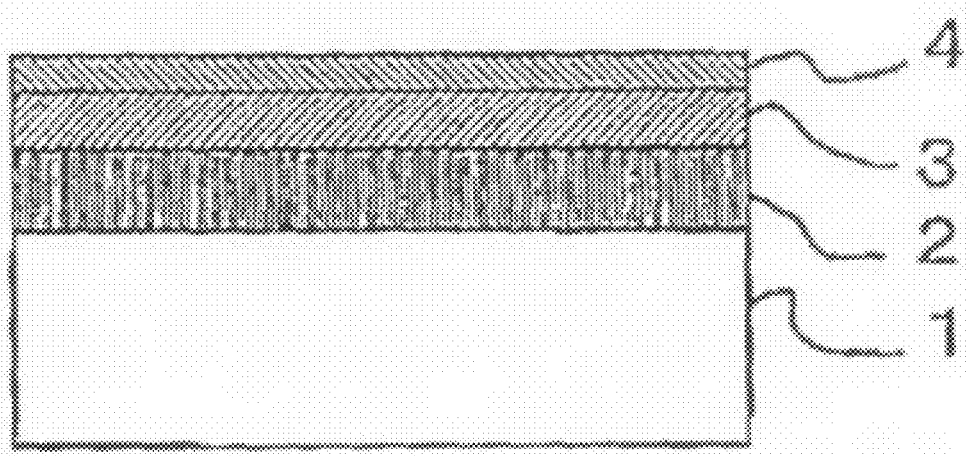
FIG. 1 is a section view showing the structure of the magnetic disk of the invention. Indicated at 1 is a substrate; at 2, a recording layer; at 3, a protective layer; and at 4, a lubricant layer.

The invention will be described in more detail with reference to the following examples and test examples to which, however, the invention is not limited.

Example 1

Preparation of A-CH$_2$—Rf—CH$_2$O—B—OCH$_2$—Rf-CH$_2$-A (Compound 1)

A is a group of the formula (a) below, p is 1, B is a group of the formula (b) below, R is m-CF$_3$, and Rf is —CF$_2$O(CF$_2$CF$_2$O)$_x$(CF$_2$O)$_y$CF$_2$—.

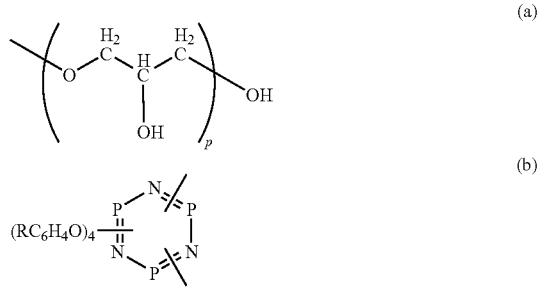

In an argon atmosphere, diisopropyl ether (670 g), trifluoromethyl phenol (170 g) and metallic sodium (20 g) were agitated at room temperature for 30 hours, and cyclotriphosphonitrile chloride (50 g) was thereafter added to the mixture at room temperature. The reaction mixture was agitated at 40° C. for 30 hours, then washed with water and dewatered to obtain 120 g of cyclophosphonitrile having a substituent of trifluoromethylphenoxy group. This compound (25 g) was dissolved in ditrifluoromethylbenzene (120 g), and 60 g of a perfluoropolyether (2000 in average molecular weight) having one hydroxyl group at one terminal and two hydroxyl groups at the other terminal and metallic sodium (1.5 g) were added to the solution, followed by agitation at 70° C. for 24 hours. The resulting mixture was washed with water and subsequently purified by column chromatography, affording 4 g of the desired Compound 1.

Compound 1 was a colorless transparent liquid and had a density of 1.75 g/cm$^3$ at 20° C. Compound 1 was identified by NMR with the result shown. Compound 1 as obtained was used for $^{19}$F-NMR. $^1$H-NMR analysis was conducted by a sample obtained by adding trifluoroacetic anhydride to Compound 1 to modify the hydroxyl to an ester.

$^{19}$F-NMR (solvent: none, reference material: OCF$_2$CF$_2$OCF$_2$CF$_2$O in the obtained product being taken as −89.1 ppm):

δ=−52.1~−55.4 ppm

[43F, —C$\underline{F}_2$O—]

δ=−64.1 ppm

[12F, —CH$_2$O—[P$_3$N$_3$(OC$_6$H$_4$C$\underline{F}_3$)$_4$]—OCH$_2$—]

δ=−78.0 ppm, −80.0 ppm

[4F, —C$\underline{F}_2$CH$_2$OCH$_2$CH(OH)CH$_2$OH]

δ=−78.7 ppm, −80.7 ppm

[4F, —C$\underline{F}_2$CH$_2$O—[P$_3$N$_3$(OC$_6$H$_4$CF$_3$)$_4$]—OCH$_2$C$\underline{F}_2$—]

δ=−89.1~−90.7 ppm

[40F, —C$\underline{F}_2$CF$_2$O—]
X=9.8 y=10.8

$^1$H-NMR (solvent: perfluorohexane, reference material: D$_2$O):

δ=±3.38~3.83 ppm

[8H, —CF$_2$C$\underline{H}_2$OC$\underline{H}_2$CH(OCOCF$_3$) CH$_2$OCOCF$_3$], δ=±3.65~3.80 ppm

[4H, —CF$_2$C$\underline{H}_2$O—[P$_3$N$_3$(OC$_6$H$_4$CF$_3$)$_4$]—OC$\underline{H}_2$CF$_2$—], δ=4.35~4.46 ppm

[4H, —CF$_2$CH$_2$OCH$_2$C$\underline{H}$(OCOCF$_3$) C$\underline{H}_2$OCOCF$_3$], δ=5.26~5.36 ppm

[2H, —CF$_2$CH$_2$OCH$_2$C$\underline{H}$(OCOCF$_3$) CH$_2$OCOCF$_3$],

Example 2

Preparation of A-CH$_2$—Rf—CH$_2$O—B—OCH$_2$—Rf-CH$_2$-A (Compound 2)

A is a group of the formula (a) below, p is 1, B is a group of the formula (b) below, R is m-CF$_3$, and Rf is —CF$_2$CF$_2$O(CF$_2$CF$_2$CF$_2$O)$_n$CF$_2$CF$_2$—.

In an argon atmosphere, diisopropyl ether (670 g), trifluoromethyl phenol (170 g) and metallic sodium (20 g) were agitated at room temperature for 30 hours, and cyclotriphosphonitrile chloride (50 g) was thereafter added to the mixture at room temperature. The reaction mixture was agitated at 40° C. for 30 hours, then washed with water and dewatered to obtain 120 g of cyclophosphonitrile having a substituent of trifluoromethylphenoxy group. This compound (25 g) was dissolved in ditrifluoromethylbenzene (120 g), and 60 g of a perfluoropolyether (2000 in average molecular weight) having one hydroxyl group at one terminal and two hydroxyl groups at the other terminal and metallic sodium (1.5 g) were added to the solution, followed by agitation at 70° C. for 24 hours. The resulting mixture was washed with water and subsequently purified by column chromatography, affording 4 g of the desired Compound 2.

Compound 2 was a colorless transparent liquid and had a density of 1.8 g/cm$^3$ at 20° C. Compound 2 was identified by NMR with the result shown. Compound 2 as obtained was used for $^{19}$F-NMR. $^1$H-NMR analysis was conducted by a sample obtained by adding trifluoroacetic anhydride to Compound 2 to modify the hydroxyl to an ester.

$^{19}$F-NMR (solvent: none, reference material: $OCF_2CF_2CF_2O$ in the obtained product being taken as −129.7 ppm):

δ=−64.1 ppm

[12F, —$CH_2O$—[$P_3N_3(OC_6H_4CF_3)_4$]—$OCH_2$—]

δ=−83.7 ppm

[84F, —$CF_2CF_2CF_2O$—],

δ=−85.7 ppm

[4F, —$CF_2CF_2CH_2O$—[$P_3N_3(OC_6H_4CF_3)_4$]—$OCH_2CF_2$$CF_2$—]

δ=−86.4 ppm

[4F, —$CF_2CF_2CH_2OCH_2CH(OH)CH_2OH$],

δ=−124.4 ppm

[4F, —$CF_2CF_2CH_2O$—[$P_3N_3(OC_6H_4CF_3)_4$]—$OCH_2CF_2$$CF_2$—]

δ=−127.5 ppm

[4F, —$CF_2CF_2CH_2OCH_2CH(OH)CH_2OH$],

δ=−129.7 ppm

[42F, —$CF_2CF_2CF_2O$—]
z=10.5

$^1$H-NMR (solvent: perfluorohexane, reference material: $D_2O$):

δ=3.38~3.83 ppm

[8H, —$CF_2CF_2CH_2OCH_2CH(OCOCF_3)\ CH_2OCOCF_3$],

δ=3.65~3.80 ppm

[4H, —$CF_2CF_2CH_2O$—[$P_3N_3(OC_6H_4CF_3)_4$]—$OCH_2$$CF_2CF_2$—],

δ=4.35~4.46 ppm

[4H, —$CF_2CF_2CH_2OCH_2CH(OCOCF_3)\ CH_2OCOCF_3$],

δ=5.26~5.36 ppm

[2H, —$CF_2CF_2CH_2OCH_2CH(OCOCF_3)CH_2OCOCF_3$],

Test Example 1

Measurement of Bonded Ratio

Each of Compounds 1, 2 prepared in Examples 1, 2 was dissolved in Vertrel-XF, product of DuPont. The solution was 0.1 wt. % in the concentration of the compound. A magnetic disk, 3.5 inches in diameter, was immersed in the solution for 1 minute and then withdrawn at a rate of 2 mm/s. The disk was thereafter held in a constant-temperature chamber at 150° C. for 10 minutes to promote the adhesion of the lubricant to the disk surface. The average film thickness of the compound on the disk was subsequently measured by a Fourier Transform Infrared Spectrometer (FT-IR). This film thickness was taken as f Å. Next, the disk was immersed in Vertrel-XF for 10 minutes, withdrawn at a rate of 10 mm/s and thereafter allowed to stand at room temperature for the evaporation of the solvent. The compound remaining on the disk was thereafter checked by FT-IR for average film thickness. This film thickness was taken as b Å. The bonded ratio generally in use was used as an indicator for showing the strength of adhesion of the film to the disk. The bonded ratio was expressed by the equation given below.

Bonded ratio (%)=100×b/f

Used for comparison were a straight-chain perfluoropolyether compound [MORESCO Phospharol A20H-2000, product of MORESCO Corporation] having at one terminal a cyclophosphazene group substituted with aryloxy group and at the other terminal one hydroxyl group, a straight-chain perfluoropolyether compound [POOH-2000, product of MORESCO Corporation] having at one terminal a cyclophosphazene group substituted with aryloxy group and at the other terminal two hydroxyl groups, and a perfluoropolyether [Fomblin Ztetraol-20005, product of Solvay Solexis] having two hydroxyl groups at each of opposite terminals. MORESCO Phospharol A20H will be referred to as Compound 3, ADOH-2000 as Compound 4, and Fomblin Ztetraol of Solvbay Solexis as Compound 5. $R^1$—$OCH_2CF_2O$$(CF_2CF_2O)_x(CF_2O)_yCF_2CH_2OH$ (Compound 3) wherein $R^1$ is $(m\text{-}CF_3C_6H_4O)_5$—$P_3N_3$—, (—$P_3N_3$— is cyclic), x is 10.5, y is 10.1. $R^1$—$OCH_2CF_2O(CF_2CF_2O)_x(CF_2O)_yCF_2$$CH_2OCH_2CH(OH)CH_2OH$ (Compound 4) wherein $R^1$ is (m—$CF_3C_6H_4O)_5$—$P_3N_3$— (—$P_3N_3$— is cyclic), x is 10.7, y is 10.4. $HOCH_2CH(OH)CH_2OCH_2CF_2O(CF_2CF_2O)_x$$(CF_2O)_yCF_2CH_2OCH_2CH(OH)CH_2OH$ (Compound 5) wherein x is 0.1, y is 10.9.

These compounds were checked for bonded ratio. Table 1 shows the results. It was confirmed that the present perfluoropolyether compounds 1,2 having a cyclophosphazene group and hydroxyl have effects of forming a lubricant layer which firmly adheres to the magnetic disk.

TABLE 1

| Specimen | Bonded ratio (%) |
|---|---|
| Compound 1 | 67 |
| Compound 2 | 61 |
| Compound 3 (A20H-2000) | 9 |
| Compound 4 (ADOH-2000) | 34 |
| Compound 5 (Ztetraol-2000S) | 40 |

Test Example 2

Measurement of Decomposition Resistance to Aluminum Oxide

A sample was used which was prepared from each of Compounds 1 and 2 prepared in Examples 1, 2, by adding 20 wt. % of $Al_2O_3$ (ICN Alumina B, Akt. I, product of MP Biomedicals, 100 μm in mean particle size) to the compound, intensely shaking the mixture and thereafter thoroughly agitating the mixture with ultrasonic waves. The sample was checked for thermal behavior in the presence of $Al_2O_3$ using a thermal analyzer (TG/TDA). The sample (20 mg) was placed into an aluminum container and heated in a nitrogen atmosphere at a constant temperature of 250° C., and the weight reduction of the compound was measured after the lapse of a specified period of time. For comparison, 20 mg of each of Compounds 1, 2 was thermally analyzed in the same manner as above with the exception of adding no $Al_2O_3$. For further comparison, Compounds 3 to 5 were also used.

Table 2 shows the results. Table 2 indicates that Compounds 1, 2, i.e., the perfluoropolyether having a cyclophosphazene group in the molecular main chain and hydroxyl at the molecular opposite terminals, like Compounds 3, 4 similarly having a cyclophosphazene group, did not exhibit a promoted weight reduction attributable to $Al_2O_3$ and was found to have high decomposition resistance. Table 1 reveals that Compounds 1, 2 of the present invention are apparently higher in adhesion properties than Compounds 3, 4, and are satisfactory in both decomposition resistance and adhering properties, thus substantiating the effectiveness of the present compounds.

TABLE 2

| Specimen | Ratio of decrease in weight (%) | | | |
|---|---|---|---|---|
| | Absence of Al₂O₃ | | Presence of Al₂O₃ | |
| | After 100 min | After 200 min | After 100 min | After 200 min |
| Compound 1 | 3 | 4 | 4 | 5 |
| Compound 2 | 2 | 3 | 3 | 4 |
| Compound 3 (A20H-2000) | 5 | 9 | 6 | 8 |
| Compound 4 (ADOH-2000) | 4 | 5 | 7 | 8 |
| Compound 5 (Ztetraol-2000S) | 26 | 37 | 39 | 97 |

Example 3

Preparation of Magnetic Disk

Each of Compounds 1, 2 prepared in Examples 1, 2 was dissolved in Vertrel-XF, product of DuPont. The solution was 0.1 wt. % in the concentration of the compound. A magnetic disk, 3.5 inches in diameter, was immersed in the solution for 1 minute and then withdrawn at a rate of 2 mm/s. The disk was thereafter dried at 150° C. for 10 minutes.

The coated compound was thereafter checked by FT-IR for film thickness.

Table 3 shows the results. It was confirmed that the magnetic disk can be obtained which is coated with the present compound and is satisfactory in both adhering properties and decomposition suppressing effects.

TABLE 3

| Specimen | Film thickness (Å) |
|---|---|
| Compound 1 | 20 |
| Compound 2 | 19 |

From the above, the perfluoropolyether having a cyclophosphazene group in the molecular main chain and hydroxyl at the molecular opposite terminals is satisfactory in both adhering properties and decomposition suppressing effects, and it is confirmed that the magnetic disk can be obtained which is coated with the compound.

INDUSTRIAL APPLICABILITY

The present perfluoropolyether compound having a cyclophosphazene group in the molecular main chain and hydroxyl at the molecular opposite terminals provides a lubricant which is satisfactory in both adhering properties and decomposition suppressing effects at the same time. The magnetic disk using the present compound as a lubricant can endure high speed and continuous rotation.

The invention claimed is:

1. A compound of the formula (I)

$$A\text{-}(CH_2\text{—}Rf\text{—}CH_2O\text{—}B\text{—}O)_n\text{—}CH_2\text{—}Rf\text{—}CH_2\text{-}A \quad (I)$$

wherein n is an integer of 1 to 4, A is a group of the formula (a) below, and B is a group of the formula (b) below, p being 1 or 2, R being $C_{1-4}$ fluoroalkyl, Rf is —$CF_2O(CF_2CF_2O)_x(CF_2O)_yCF_2$— or —$CF_2CF_2O(CF_2CF_2CF_2O)_zCF_2CF_2$—, x, y and z being each a real number of 0 to 50

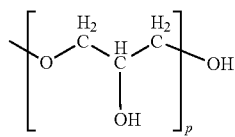
(a)

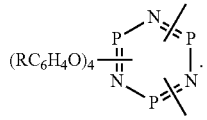
(b)

2. A compound as defined in claim 1 wherein n is 1, and p is 1 or 2.

3. A lubricant containing a compound of the formula (I)

$$A\text{-}(CH_2\text{—}Rf\text{—}CH_2O\text{—}B\text{—}O)_n\text{—}CH_2\text{—}Rf\text{—}CH_2\text{-}A \quad (I)$$

wherein n is an integer of 1 to 4, A is a group of the formula (a) below, and B is a group of the formula (b) below, p being 1 or 2, R being $C_{1-4}$ fluoroalkyl, Rf is —$CF_2O(CF_2CF_2O)_x(CF_2O)_yCF_2$— or —$CF_2CF_2O(CF_2CF_2CF_2O)_nCF_2CF_2$—, x, y and z being each a real number of 0 to 50

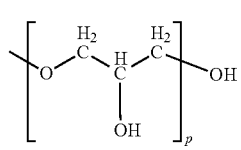
(a)

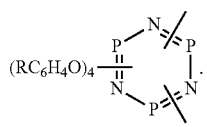
(b)

4. A lubricant as defined in claim 3 wherein n is 1, and p is 1 or 2.

5. A magnetic disk having at least a recording layer and a protective layer formed over a substrate, and a lubricant layer provided over a surface of the resulting assembly and comprising a compound containing a perfluoropolyether structure, the disk having a compound of the formula (I) as the lubricant layer $$A\text{-}(CH_2\text{—}Rf\text{—}CH_2O\text{—}B\text{—}O)_n\text{—}CH_2\text{—}Rf\text{—}CH_2\text{-}A \quad (I)$$

wherein n is an integer of 1 to 4, A is a group of the formula (a) below, and B is a group of the formula (b) below, p being 1 or 2, R being $C_{1-4}$ fluoroalkyl, Rf is —$CF_2O(CF_2CF_2O)_x(CF_2O)_yCF_2$— or —$CF_2CF_2O(CF_2CF_2CF_2O)_zCF_2CF_2$—, x, y and z being each a real number of 0 to 50

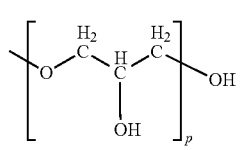
(a)

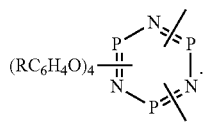
(b)

6. A magnetic disk as defined in claim 5 wherein n is 1, and p is 1 or 2.

* * * * *